INVENTOR.
ROBERT J. PLOW

Oct. 1, 1968 R. J. PLOW 3,404,328
APPARATUS FOR GRADUAL LOADING OF AC LINE
POWER BY AN AC TO DC CONVERTER
Filed Aug. 2, 1965 4 Sheets-Sheet 3

INVENTOR.
ROBERT J. PLOW
BY John Howard Smith
ATT'Y

INVENTOR.
ROBERT J. PLOW

United States Patent Office 3,404,328
Patented Oct. 1, 1968

3,404,328
APPARATUS FOR GRADUAL LOADING OF AC
LINE POWER BY AN AC TO DC CONVERTER
Robert J. Plow, Avon Lake, Ohio, assignor to Lorain
Products Corporation, a corporation of Ohio
Filed Aug. 2, 1965, Ser. No. 476,613
9 Claims. (Cl. 321—18)

ABSTRACT OF THE DISCLOSURE

A control circuit for polyphase AC to DC converters which employ phase controlled rectification. A start control circuit gradually increases power transmission to the full load value without impressing undesirable transients in the associated AC line. This is accomplished by the use of a bias activating SCR and a biasing capacitor which, when discharged, permits conduction through a start control transistor to inhibit excessive starting in-rush current and, as the capacitor charges, reverse biases the start control transistor to afford normal, operating current to the converter.

---

Figure 1:
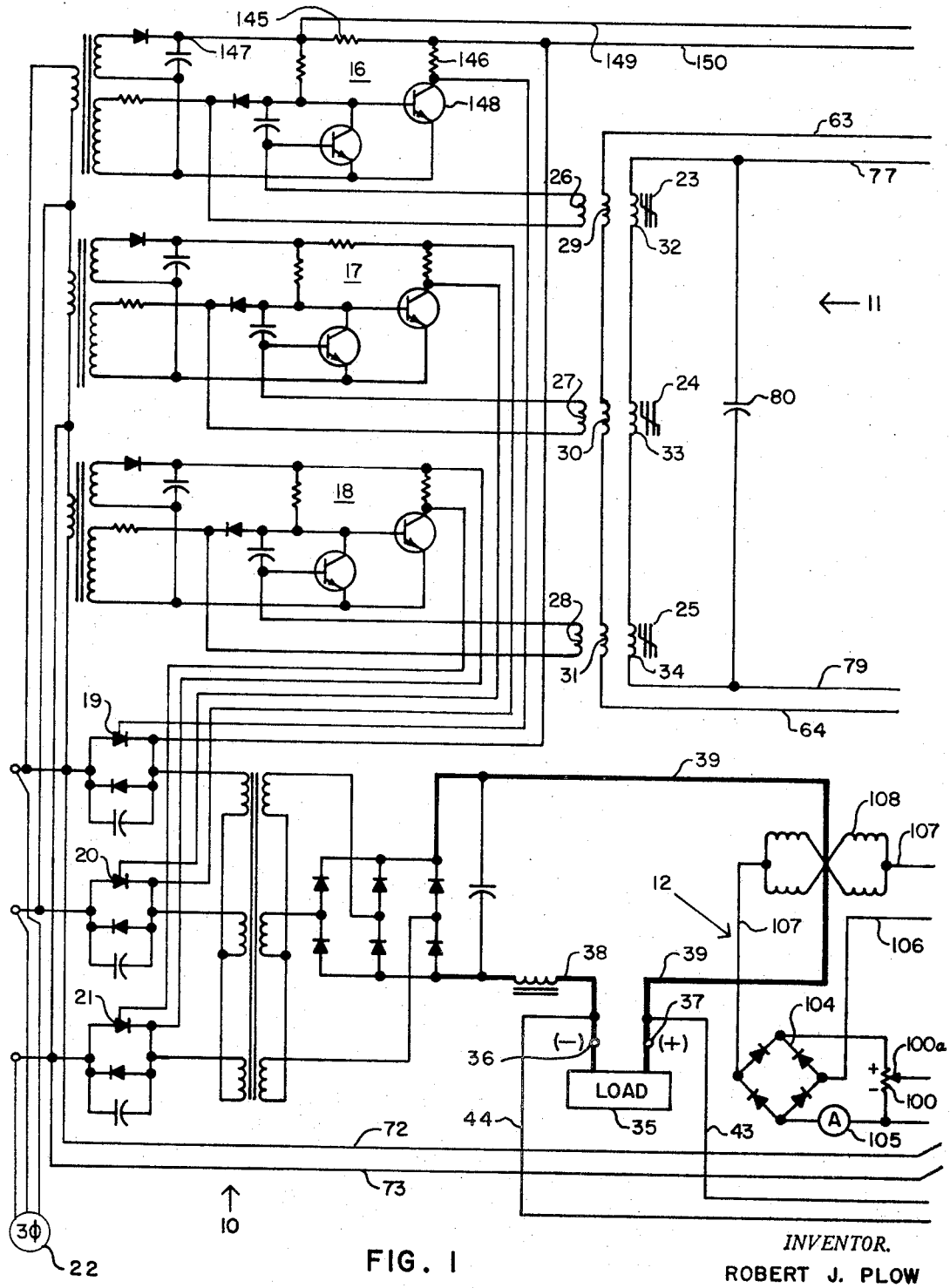

This invention relates to AC to DC converters and is directed more particularly to circuitry which provides a controlled start for such a converter.

It is well-known that when electrical equipment requiring heavy input current flow for operation is connected to an AC line, the voltage applied to other equipment connected to the same line will drop briefly. This decrease of line voltage may adversely affect the operation of the other equipment, particularly devices such as computers.

An example of equipment which at times draws relatively great line current is a battery charger utilized in the telephone industry to maintain a battery of wet cells in a fully charged condition while line power is available. Telephone circuits and DC operated equipment are connected across the battery.

In the event of line power failure, the battery will become discharged to an extent dependent upon the current drawn by the telephone circuits and the length of the line power interruption. The discharged battery will cause the output current of the battery charger to be very high when the AC line power returns to normal. Consequently, the battery charger input current will also be great.

Upon restoration of the AC line power, most of the equipment connected thereacross begins to operate normally. However, the battery charger, due to the requirements of the various control circuits incorporated therein, does not immediately begin supplying current to the battery. As soon as the control circuits attain operative states, the battery charger suddenly begins supplying current to the battery. As a result, the AC line will be heavily loaded causing the line voltage to drop thereby adversely affecting the operation of other equipment connected to the AC line.

Loading of the AC line by a battery charger, as just described, may take place at times other than when AC line power is restored after an interruption of some duration or when the charger is initially energized. For example, a momentary interruption of AC line power may result in loading of the AC line by the battery charger, particularly if the charger is supplying near its maximum rated current output to the battery.

Accordingly, it is an object of the invention to provide improved circuitry which prevents sudden loading of the AC line when an AC to DC converter is initially started or after the line power is momentarily interrupted.

It is another object of the invention to provide novel circuitry which will gradually increase the conduction angle of controlled rectifier means in an AC to DC converter after line power is supplied thereto.

In one aspect of the invention, it is an object to provide means for suitably controlling the output voltage sensing circuit of an AC to DC converter under starting conditions or after interruption of the AC line power.

It is another object of the invention to provide an AC to DC converter with start controlling circuitry which controls the output voltage sensing circuit in response to signals from pulse generating means, the pulse generating means also controlling controlled rectifier means connected between an AC source and a load.

It is still another object of the invention to provide circuitry in which, after AC is applied to an AC to DC converter, a controlled rectifier is rendered conducting by a pulse generating circuit to charge a start controlling bias capacitor thereby decreasing the conduction of a start controlling transistor adapted to appropriately control the output voltage sensing circuit. When the bias capacitor is in a discharged condition, the start controlling transistor conducts thereby causing the output voltage sensing circuit to reduce the output voltage so that output current is of small magnitude. As the bias capacitor charges, the output current of the converter will gradually increase to its normal value.

In a second aspect of the invention, it is an object to provide means for rendering a current limiting circuit of an AC to DC converter operative under starting conditions or after interruption of the AC line power.

Still another object of the invention is to provide in an AC to DC converter a start controlling circuit which controls the current limiting circuit in response to signals from pulse generating means, the pulse generating means also controlling controlled rectifier means connected between an AC source and a load.

It is yet another object of the invention to provide circuitry in which, after AC voltage is applied to an AC to DC converter, a controlled rectifier is rendered conducting by a pulse generating circuit to charge a start controlling bias capacitor thereby decreasing the conduction of a start controlling transistor which controls the current limiting circuit. When the bias capacitor is in a discharged condition, the current limiting circuit is rendered operative thereby causing the output voltage sensing circuit to reduce the output voltage so that output current is of a small magnitude. As the bias capacitor charges, the output current will gradually increase to normal value.

Figure 2:
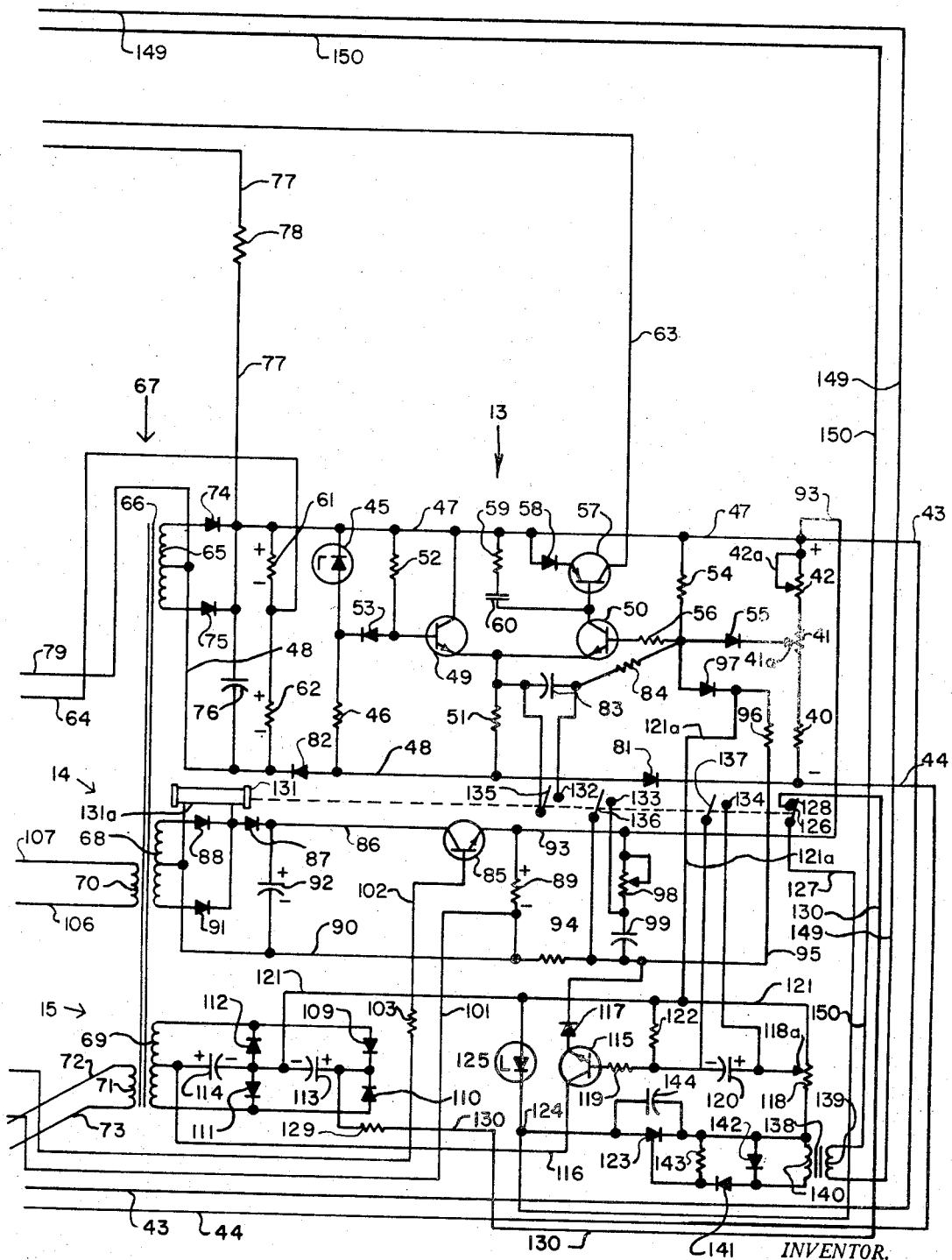
Figure 3:
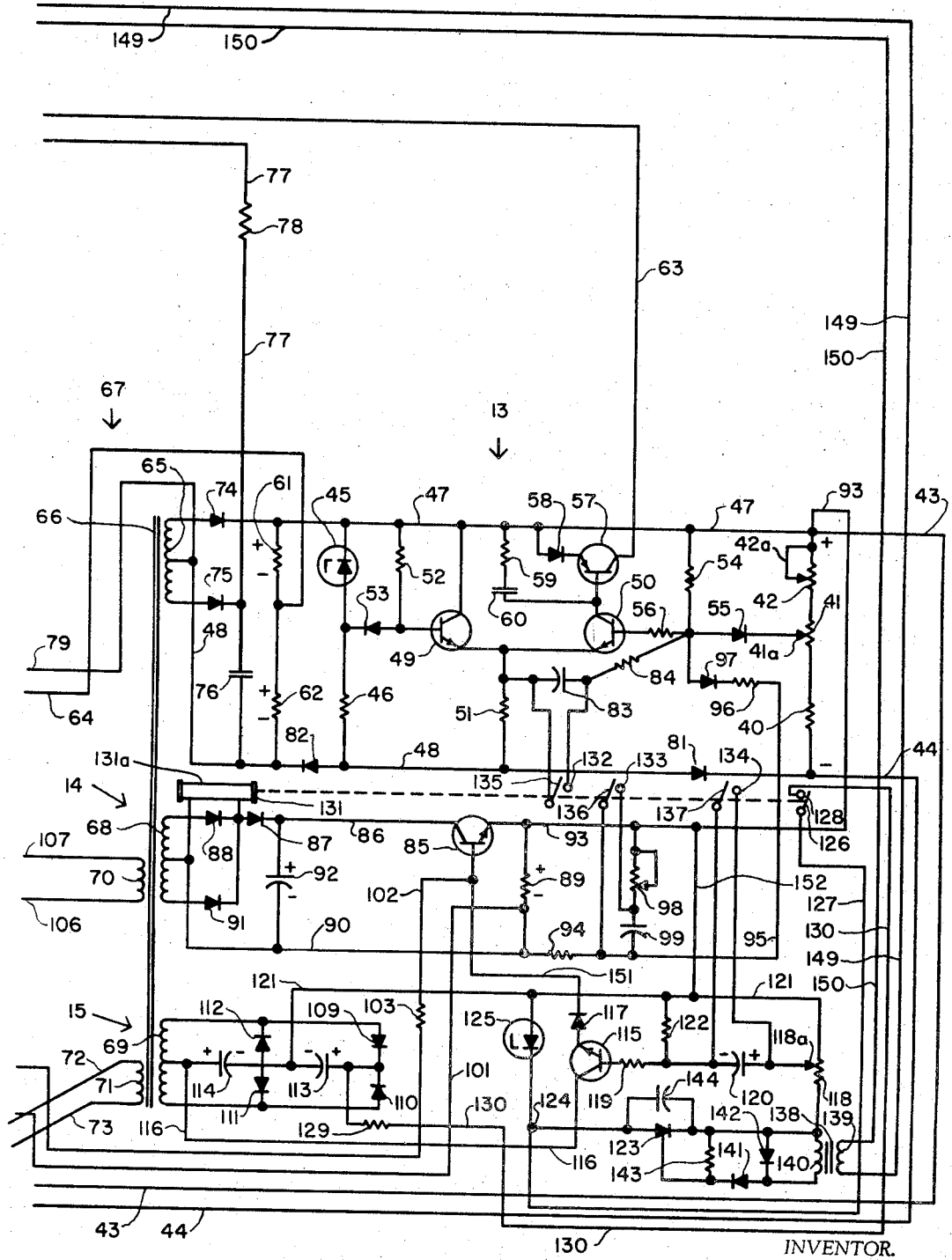
Figure 4:
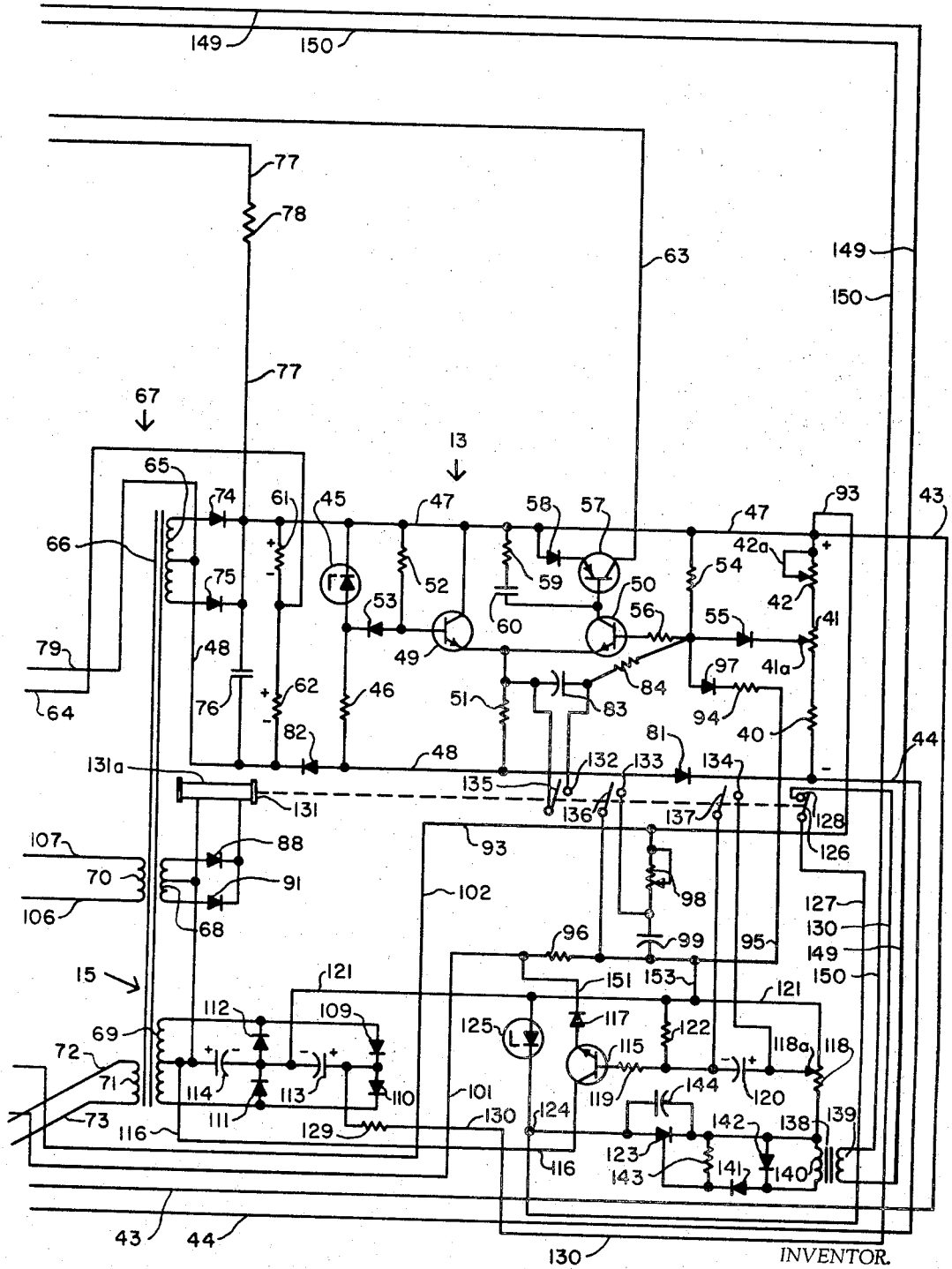

Other objects and advantages of the invention will become apparent from the following description and accompanying drawings in which:

FIGURE 1 is a schematic drawing of a portion of the circuitry embodying the invention, FIGURE 2 is a contiguous schematic drawing of a remainder of the circuitry embodying the invention, FIGURE 3 illustrates the circuitry of FIGURE 2 in a modified form and, FIGURE 4 shows another variation of the circuit of FIGURE 2.

Referring to FIGURES 1 and 2, it will be seen that the circuitry embodying the invention may include a power circuit section 10, a pulse generating circuit section 11, a load current proportional circuit section 12 arranged to produce a current proportional to load current, a voltage regulating circuit section 13, a current limiting circuit section 14, and a controlled start circuit section 15. The power circuit section 10, the pulse generating circuit section 11 and the voltage regulating circuit section 13 are substantially the same as shown in the application of Robert J. Plow for a Poly-Phase Converter, Ser. No. 367,507, filed May 14, 1964.

The power circuit section 10 and the pulse generating circuit section 11 are described in detail in the application referred to above. In general, the pulse generating circuits 16, 17 and 18 of the pulse generating section 11 supply firing pulses to respective control rectifiers 19, 20 and 21. These pulses are derived from the cyclic voltage variations of a three-phase source 22, these voltage alternations also being applied to the controlled rectifiers 19, 20 and 21. The output pulses from the pulse generators 16, 17 and 18 may be varied timewise with respect to the voltage alternations of the three-phase source 22 by means of saturable inductors 23, 24 and 25 which are provided for the pulse generator circuits 16, 17 and 18, respectively.

The saturable inductors 23, 24 and 25 are provided with respective gate windings 26, 27 and 28, control windings 29, 30 and 31 and bias windings 32, 33 and 34. The bias winding may be supplied with current from any suitable DC source to establish an operating point for the saturable inductors 23, 24 and 25. Current for the control windings 29, 30 and 31 is supplied from the voltage regulating circuit section 13, as will be described presently. As the current through the control windings is increased, the saturable inductors 23, 24 and 25 will become saturated correspondingly earlier in each cycle of the AC input voltage. Conversely, as the current through the control windings decreases, the saturation will occur later in each cycle.

From the foregoing it will be seen that when the current through the control windings 29, 30 and 31 is high, the pulses supplied to the controlled rectifiers 19, 20 and 21 from the respective pulse generators 16, 17 and 18 will occur early in each cycle of the respective phase voltages of the three-phase source 22. Accordingly, the controlled rectifiers 19, 20 and 21 will be rendered conducting relatively early in each cycle so that the conduction angle of each of the controlled rectifiers is relatively long and a correspondingly high voltage and/or current will be supplied to a load 35 through output terminals 36 and 37 and output leads 38 and 39. If the current through the control windings 29, 30 and 31 is low, the output pulses of the pulse generator circuits 16, 17 and 18 will occur relatively late in the cycle of their respective AC input voltages. Consequently, the conduction angle of the controlled rectifiers 19, 20 and 21 is reduced and the current and/or voltage delivered to the load 35 will be low.

In order to maintain the voltage between the output terminals 36 and 37 at a constant value despite variations in the current drawn by the load 35, the voltage regulating circuit section 13 is provided. This voltage regulating circuit may include a voltage divider formed by a resistor 40, a potentiometer 41 having a wiper arm 41a and a variable resistor 42 having a wiper arm 42a. The upper end of the voltage divider is connected to the output lead 39 through a lead 43 and the lower end of the voltage divider is connected to the output lead 38 through a lead 44 in order that the voltage between the output terminals 36 and 37 may be impressed across the voltage divider.

To provide a constant voltage reference to which the voltage of the divider connected between the leads 43 and 44 may be compared, a Zener diode 45 and a resistor 46 are serially connected between leads 47 and 48. These leads are connected to the upper and lower ends of the variable resistor 42 and the resistor 40, respectively. The comparison of the Zener diode voltage to the voltage appearing between the leads 38 and 39, as manifested by the voltage present between the lead 47 and the wiper arm 41a, is effected by a differential amplifier which may include N-P-N type transistors 49 and 50. The emitter electrodes of the transistors 49 and 50 are common connected to the upper end of a resistor 51, as shown, the lower end of the resistor 51 being connected to the lead 48. A resistor 52 and a diode 53 serially connected between the lead 47 and the upper end of the resistor 46, the base electrode of the transistor 49 being connected to a point between the resistor 52 and the diode 53, establish a current path which aids the transistor 49 in turning on when the converter is first energized from the AC source under conditions where no voltage is present between the leads 43 and 44. Such a condition occurs, for example, when the load 35 does not include a battery.

In order to control the conduction of the transistor 50, a resistor 54 and a diode 55 are serially connected between the lead 47 and the wiper arm 41a of the potentiometer 41. The base electrode of the transistor 50 is connected to a point between the resistor 54 and the diode 55 through a resistor 56. The diode 55 prevents any flow of current from the wiper arm 41a toward the base electrode of the transistor 50.

The signal developed on the transistor 50, before being fed to the control windings 29, 30 and 31 of the saturable inductors 23, 24 and 25, may be amplified by a P-N-P type transistor 57. To this end, the collector electrode of the transistor 50 is connected to the base electrode of the transistor 57. The emitter electrode of the transistor 57 is connected to the lead 47 through a diode 58. The operation of the transistor 57 is stabilized by a resistor 59 and a capacitor 60 connected between the emitter electrode and the base electrode of that transistor.

In order to effect control of the saturable inductors 23, 24 and 25 by the voltage regulating circuit 13, the control windings 29, 30 and 31 of the saturable inductors are serially connected between the collector electrode of the transistor 57 and a point on a voltage divider formed by resistors 61 and 62 and connected between the leads 47 and 48 by means of leads 63 and 64, respectively. Current for the bias windings 32, 33 and 34 of the saturable inductors 23, 24 and 25 is supplied from a rectifying circuit which includes a center-tapped secondary winding 65 carried on the core 66 of a transformer 67. The transformer 67 also includes center-tapped secondary windings 68 and 69, a secondary winding 70, and a primary winding 71. To energize transformer 67, the primary winding 71 of that transformer is connected to one phase of the three-phase source 22 by means of the leads 72 and 73.

For the purpose of forming a DC power supply which will supply current to the bias windings 32, 33 and 34 and to resistor 52 and diode 53, the opposite ends of the secondary windings 65 are connected through respective rectifiers 74 and 75 to the lead 47 while the center tap of the winding is connected to the lead 48. A capacitor 76, connected between the lead 47 and the lead 48, filters the voltage supplied by the rectifiers 74 and 75. Thus, when the transformer 67 is energized by AC power, DC voltage appears across the capacitor 76 and between the leads 47 and 48.

The current for the bias windings 32, 33 and 34 of the saturable inductors is obtained by serially connecting the bias windings between the lead 47 and the lead 48 by means of a lead 77, including a resistor 78, and a lead 79, respectively. Thus, when AC power is applied to the primary winding 71 of the transformer 67, the rectifiers 74 and 75 will direct the current through the bias windings of the saturable inductors 23, 24 and 25, to establish the operating points thereof. A capacitor 80 may be connected between the leads 77 and 79 to provide additional filtering for the voltage across the bias windings.

Additionally, the rectifiers 74 and 75 supply current which flows through the resistor 52, the diode 53 and resistor 46. The voltage developed across the resistor 52 by the current flowing therethrough aids the turn-on of the transistor 49 when the converter is initially energized.

The voltage regulating circuit 13 is completed by a diode 81 inserted in the lead 48 between resistors 51 and 40 and by a diode 82 inserted in the lead 48 between the resistors 46 and 62. These diodes serve to isolate the voltage developed across the resistors 61 and 62 by the rectifiers 74 and 75 from the potential which will be present across the voltage divider comprising the resistors 40, 41 and 42 if the load 35 includes a battery. A capacitor 83 and a resistor 84 may be serially connected between the upper end of the resistor 51 and the lower end of the resistor 54 to improve the stability of the output voltage sensing circuit 13.

To the end that the current supplied to the load 35 from the power circuit section 10 through the leads 38 and 39 will not exceed a predetermined safe magnitude, there is provided a current limit circuit section 14. This circuit may include an N-P-N type transistor 85 which is energized by connecting the collector electrode thereof to the upper end of the winding 68 through a lead 86 and rectifiers 87 and 88 and by connecting the emitter electrode thereof to the center tap of the winding 68 through a resistor 89 and a lead 90. A rectifier 91 connected between a point common to the rectifiers 87 and 88 and the lower end of the winding 68 and a capacitor 92 connected between the leads 86 and 90 completes the circuitry for energizing the transistor 85.

In order to employ the voltage developed across the resistor 89 to control the conduction of the transistor 50 of the output voltage sensing circuit 13, the upper end of that resistor is connected to the upper end of the variable resistor 42 by means of a lead 93 while the lower end thereof is connected, as shown, to the lower end of the resistor 54 through a voltage dropping resistor 94, a lead 95, a resistor 96 and a diode 97. A variable resistor 98 and a capacitor 99 may be connected between the leads 93 and 95 to stabilize the operation of the current limiting circuit section 14.

For the purpose of monitoring the current being supplied to the load 35 from the power section 10 in order to render the transistor 85 increasingly conductive when the load current becomes greater than a predetermined magnitude, there is provided the circuit 12 which develops a current proportional to load current. This circuit may include a potentiometer 100, having one end connected, as shown, to the lower end of the resistor 89 through a lead 101, and including wiper arm 100a which is connected to the base electrode of the transistor 85 by means of a lead 102. A resistor 103 may be connected in the lead 102 to reduce the voltage applied to the base electrode of the transistor 85.

In order to develop a load current proportional voltage across the potentiometer 100, the potentiometer is connected across the output terminals of a rectifier bridge 104 through an ammeter 105. One of the input terminals of the rectifier is connected to the winding 70 on the transformer 68 through a lead 106 while the other input terminal is connected to the winding 70 by means of the lead 107 which includes the gate windings of a magnetic amplifier 108. The lead 39 is passed through the magnetic amplifier 108 to vary the impedance of the gate windings proportionately but inversely to the current flowing from the power circuit 10 to the load 35 through the lead 39. With this arrangement, the current supplied to the input terminals of the rectifier 104 and to the potentiometer 100 is proportional to the load current. Consequently, the voltage on the potentiometer 100 is proportional to load current and potentiometer thus serves as a load current proportional means.

To the end that the output load current of the AC to DC converter will start at a very low value and increase gradually each time the converter is energized from the three-phase source 22, whether on initial start or after a momentary interruption, so that the current drawn from the three-phase source by the converter will increase gradually, the start controlling circuit 15 is provided. This circuit may be energized by a dual voltage DC power supply formed by connecting suitable rectifiers 109, 110, 111 and 112, as shown, across the winding 69 of the transformer 67. A first voltage of the power supply is developed across a capacitor 113 connected between a point common to the rectifiers 109 and 110 and a point common to the rectifiers 111 and 112 while a second voltage is developed across a capacitor 114 connected between the center tap of the winding 69 and the point common to the rectifiers 111 and 112. With this arrangement, the capacitor 113 is across the output of a bridge-type rectifier circuit formed by the four rectifiers 109 through 112 while the capacitor 114 is across the output of a center tapped, full wave rectifying circuit including the rectifiers 111 and 112. The DC voltage on the capacitor 113 is about twice the value of that on the capacitor 114.

In order that the start controlling circuit 15 may control the output voltage sensing circuit 13, and more specifically the transistor 50, there is provided in the circuit 15 an N-P-N type transistor 115 having its collector electrode connected to the center tap of winding 69 through a lead 116 and its emitter electrode connected to the lead 95 through a diode 117. In order to bias the transistor 115, the base electrode of that transistor is connected to the wiper arm 118a of a potentiometer 118 through a resistor 119 and a capacitor 120 as shown. The upper end of the potentiometer 118 is connected to the negative side of the capacitor 113 through a lead 121. A resistor 122 connected between the lead 121 and the resistor 119 completes the bias network of the transistor 115.

As will be seen presently, the capacitor 120, when charged, reverse biases the transistor 115 and consequently the start controlling circuit 15 has no effect on the operation of the output voltage sensing circuit 13. To the end that the capacitor 120 will begin charging when the pulse generating circuits 16, 17 and 18 begin supplying turn-on pulses to the controlled rectifiers 19, 20 and 21, a controlled rectifier 123 is connected between the lower end of the potentiometer 118 and a junction point 124 at the lower end of a Zener diode 125, the upper end of which is connected to the lead 121. To complete the current path through which the capacitor 120 charges, the junction point 124 is connected to a contact arm 126 of a relay 131 through a lead 127 and the positive side of the capacitor 113 is connected to a fixed contact 128 of the relay 131 through a resistor 129 and the lead 130.

The relay 131 includes a winding 131a connected across the rectifier 88 of the current limiting circuit section 14 and fixed contacts 132, 133, 134 and 128 and contact arms 135, 136, 126 and 137. To the end that the capacitor 120 may be discharged each time the AC power is interrupted so that the transistor 115 may turn on to control the output voltage sensing circuit thereby reducing the output current, the fixed contact 134 and the contact arm 137 are bridged across this capacitor. Consequently, even a momentary interruption of the AC voltage being applied to the primary winding 71 of the transformer 67 will momentarily de-energize the relay 131, allowing the contact arm 137 to become positioned against the fixed contact 134, thereby shorting the capacitor 120, and allowing the contact arm 126 to be released from the fixed contact 128 to open the current path through which capacitor 120 normally charges. The contact arm 135 and the fixed contact 132 are connected across the capacitor 83 and the contact arm 136 and the fixed contact 133 of the relay 131 are connected across the capacitor 99 to discharge the respective capacitors when the relay is de-energized.

To the end that the controlled rectifier 123 may be rendered conducting to pass current to the capacitor 120 concurrently with the application of turn-on pulses to the controlled rectifiers 19, 20 and 21 from the pulse generating circuits 16, 17 and 18, a pulse transformer 138 having a primary winding 139 and a secondary winding 140 is provided. Turn on pulses are supplied to the controlled rectifier 123 from the secondard winding 140, the upper end of which, as shown, is connected to the lower end of the potentiometer 118, the lower end of the winding being connected to the gate electrode of the controlled rectifier 123 through a diode 141 which serves to block any reverse current flow through the gate electrode of that controlled rectifier. A diode 142 may be connected across the secondary winding 140 to suppress any voltage pulses of unsuitable polarity and a resistor 143 may be connected between the cathode and the gate electrode of the controlled rectifier 123 to stabilize the operation thereof. In order to prevent controlled rectifier 123 from becoming conductive, except in response to pulses being supplied from the transformer 138, a capacitor 144 may be bridged across the controlled rectifier.

The pulse of voltage which initially renders the controlled rectifier 123 conducting is obtained from a resistor 145, which, with a load resistor 146, is serially connected between the DC portential at a junction point 147 and the collector electrode of the N-P-N type output transistor 148 of the pulse generating circuit 16. Each voltage pulse appearing across the resistor 145 when the transistor 148 conducts is applied to the primary winding 139 of the pulse transformer 138 through leads 149 and 150.

Operation of the foregoing circuitry will now be described. When the converter is first energized from the three-phase source 22, the necessary potentials in the pulse generating circuits 16, 17 and 18 begin to build up and alternating current is supplied to the primary winding 71 of the transformer 67 to energize the windings 65, 68, 69 and 70 carried thereon. The appearance of voltage on these windings of the transformer 67 causes the filter capacitors 76, 92, 113 and 114 to begin charging. The presence of voltage on the winding 68 immediately energizes the relay 131 whereby the contact arms 135 and 136 and 137 are pulled away from the fixed contacts 132, 133 and 134 to unshort the capacitors 83, 99 and the start controlling bias capacitor 120, respectively. At the same time, the contact arm 126 is pulled against the fixed contact 128 to connect the lead 130 to the junction point 124 so that current can flow from the capacitor 113 to charge the capacitor 120, as will be seen presently.

As the voltage across the capacitor 76 increases, current will flow from the upper side of the capacitor 76 through the lead 47, the resistor 52, the diode 53, the resistor 46 and the diode 82 to the lower side of capacitor 76. The voltage produced across the resistor 52 by this current flow forward biases the transistor 49 causing it to turn on. The transistors 50 and 57 also become conductive in response to the conduction of transistor 49 and due to the voltage appearing between the leads 47 and 48. When the voltage of capacitor 76 becomes sufficiently great, the Zener diode 45 will break down and conduct thereby establishing a constant voltage reference source.

The increasing voltage across the capacitor 114 causes current to flow from the positive side thereof through the lead 116, the collector-emitter path of the transistor 115, the diode 117, the lead 95, the resistor 96, the lead 121a and the lead 121 to the negative side of the capacitor. The voltage developed across the resistor 96 by this current flow is applied to the base electrode of the transistor 50 through the diode 97 to prevent the conduction of transistor 50 from increasing as the voltage across the capacitor 76 rises. As a result, the transistor 57 which is controlled by the transistor 50 does not turn on fully. This restricted conduction of the transistor 57 limits the current which flows from the upper side of capacitor 76 through the lead 47, the diode 58, the emitter-collector path of the transistor 57, the lead 63, the controlled windings 29, 30 and 31 of the saturable inductors 23, 24 and 25, respectively, and through the lead 64 to the negative potential at the lower end of the resistor 61. Because of this relatively small current flow through the control windings of the saturable inductors 23, 24 and 25, these inductors saturate relatively late in each cycle of the respective input phase voltages and, therefore, when the pulse generators 16, 17 and 18 begin to supply pulses to the respective controlled rectifiers 19, 20 and 21, the conduction angles of these controlled rectifiers will be very small so that the output voltage and current supplied to the load 35 are quite low. Thus, the conduction of transistor 115, after the converter is energized from the three-phase source 22, prevents the output voltage and current of the converter from increasing rapidly.

As soon as the pulse generating circuits 16, 17 and 18 become operative, the voltage pulses developed across the resistor 145 are applied to the primary winding 139 of the pulse transformer 138 through the leads 149 and 150. These voltage pulses are then coupled to the secondary winding 140 of the pulse transformer 138 and are applied between the gate electrode and the cathode electrode of the controlled rectifier 123 through the diode 141. The first one of these pulses renders the controlled rectifier 123 conducting.

The conduction of the controlled rectifier 123 allows current to flow from the positive side of the capacitor 113 through the resistor 129, lead 130, fixed contact 128, the contact arm 126, the lead 127, the junction point 124, the controlled rectifier 123 and the lower portion of the potentiometer 118 to the wiper arm 118a. At the wiper arm 118a, the current divides and a first part flows to the positive side of the capacitor 120 and then from the negative side of the capacitor through the resistor 122 and the lead 121 to the negative side of the capacitor 113. A second portion of the current flows through the upper section of the potentiometer 118 to the lead 121 and thence to the negative side of the capacitor 113. The first portion of the current which divides at the wiper arm 118a charges the capacitor 120 causing the voltage thereacross to increase. Since the negative side of the capacitor 120 is connected to the base electrode of the transistor 115 through a resistor 119 while the positive end is connected to the emitter electrode of the transistor 115 through the upper portion of the potentiometer 118, the lead 121, the lead 121a, the resistor 96, the lead 95 and the diode 117, it will be seen that the potential across the capacitor 120 is applied between the base electrode and the emitter electrode. Thus, as the voltage across the capacitor 120 rises, the conduction of the transistor 115 decreases and when the capacitor 120 is fully charged, the transistor 115 will be nonconductive.

The decreasing conduction of the transistor 115 reduces the voltage across the resistor 96 and, consequently, the conduction of the transistors 50 and 57 increases. As the transistor 57 increases in conduction, the current flow through the control windings of the saturable inductors 23, 24 and 25 likewise increases thereby causing the saturable inductors to become saturated earlier in each of the AC input cycles. As a result, the pulses being supplied from the pulse generating circuits 16, 17 and 18 through the respective controlled rectifiers 19, 20 and 21 occur earlier in the respective input cycles to increase the conduction angle of the controlled rectifiers and the output voltage and current to the load 35.

When the capacitor 120 becomes sufficiently charged to turn off the transistor 115, the start controlling circuit 15 will no longer affect the operation of the output voltage sensing circuit section 13. Accordingly, the conduction of the transistor 50 will now be controlled by the voltage appearing between the wiper arm 41a and the upper end of the variable resistor 42, this voltage being proportional to that present between the sensing leads 43 and 44. The output voltage sensing circuit 13 is now controlling the voltage delivered to the load 35.

Assuming that the voltage across the load 35 tends to increase for some reason, the voltage between the wiper arm 41a and the upper end of the variable resistor 42 also increases as the current flow through the diode 55 toward the wiper arm 41a increases. The increase in current through the diode 55 is subtracted from the current that flows from the lead 47 through the resistor 54, the resistor 56, the base-emitter path of the transistor 50 and the resistor 51 to the lead 48. This decrease in the base-emitter current flow of the transistor 50 reduces the conduction thereof and also the conduction of the transistor 57 and the current flow through the control windings of the saturable inductors 23, 24 and 25. Accordingly, the output pulses of the pulse generating sections 16, 17 and 18 occur later in the respective AC input cycles to reduce the conductive angle of the controlled rectifiers 19, 20 and 21. This reduction of the conduction angle of the controlled rectifiers cancels the voltage increase which otherwise would have been impressed across the load 35.

If the voltage across the load 35 tends to decrease, the voltage between the wiper arm 41a and the upper end of the variable resistor 42 likewise decreases thereby decreasing the current flow through the diode 55. This allows the base-emitter current and conduction of the transistor 50 to increase thereby increasing the conduction of the transistor 57. The result of conduction of the transistor 57 is to increase the conduction angle of the controlled rectifiers 19, 20 and 21 whereby the voltage across the load 35 is prevented from decreasing.

The circuitry thus far has been described with respect to starting conditions and normal operating conditions. Assuming now that a momentary interruption of the A-C power from the three-phase source 22 occurs, the operation of the pulse generating circuits, the output voltage sensing circuit 13, and the current limiting circuit 14 will be virtually unaffected. However, the relay 131 will be momentarily de-energized, allowing the contact arm 137 to close against the fixed contact 134 thereby discharging the capacitor 120 and allowing the contact arm 126 to break from the fixed contact 128 to open the current path of the controlled rectifier 123 thereby rendering it nonconductive.

The discharging of the capacitor 120 removes the reverse bias from the transistor 115 allowing it to turn on and reduce the conduction of transistor 50 to a low level. The current supplied to the load is, therefore, also reduced to a low level, as described previously with regard to starting conditions.

The next voltage pulse supplied to the controlled rectifier 123 from the pulse generating circuit 16 renders it conducting and the capacitor 120 again begins to charge and reduce the conduction of the transistor 115. When the voltage of the capacitor 120 becomes great enough to turn off the transistor 115, the output voltage sensing circuit 13 will again be controlled by voltage of the load 35.

In the event that the load 35 requires more than a predetermined maximum value of current which may be supplied without damaging the charger, the current limiting circuit 14 will assume control of the output voltage sensing circuit 13, as will now be described. As the current flowing to the load through the lead 39 increases, the impedance of the windings of the magnetic amplifier 108 decreases in an inverse proportion to the current change. Consequently, the current supplied to the input terminals of the bridge rectifier 104 from the winding 70 on a transformer 67 and the current through the potentiometer 100 and the ammeter 105 increases in proportion to the current in the lead 39.

As this load current reaches maximum permissible value, the voltage between the wiper arm 100a and the lower end of potentiometer 100 begins to turn on the transistor 85. Current then flows from the upper end of the capacitor 92 through the collector-emitter path of transistor 85, resistor 89 and the lead 90 to the negative side of the capacitor 92 thereby producing a voltage across the resistor 89. This voltage across the resistor 89 is impressed by means of the lead 93 and the lead 95 across the serially connected arrangement comprising the resistor 54, the diode 97 and the resistor 96. As a result, some of the current normally flowing through the base-emitter path of transistor 50 is diverted and now flows through the diode 97, the resistor 96 and the lead 95 to the lower end of the resistor 89. The resulting decrease of base-emitter current in the transistor 50 reduces its conduction and, consequently, the voltage applied to the load 35. As the load current continues to increase, the current limiting circuit further reduces the conduction of the transistor 50 and the output voltage with the result that the voltage supplied to the load 35 will decrease rapidly to prevent the load current from becoming greater than the maximum predetermined value. When the current requirement of the load 35 again becomes less than the predetermined maximum value, the transistor 85 will turn off and the output voltage sensing circuit 13 will control the voltage supplied to the load 35, as described previously.

The circuit of FIGURE 3 is identical to the circuit of FIGURE 2 except for two connections. In the circuit of FIGURE 3, the emitter electrode of the transistor 115 is connected to the base electrode of the transistor 85 in the current limiting circuit 13 through the diode 117 and a lead 151 rather than being connected to the lead 95 as in FIGURE 2. Additionally, in FIGURE 3, the lead 121 is connected to the lead 93 by means of a lead 152. In FIGURE 2, the lead 121 was connected to a point between the resistor 96 and the diode 97 of the output voltage sensing circuit 13.

It will be seen from the foregoing connections that the transistor 115 is connected to the transistor 85. When the transistor 115 conducts, current will flow from the positive side of capacitor 114 through the lead 116, the collector-emitter path of transistor 115, diode 17, lead 151, base-emitter path of transistor 85, the lead 93, the lead 152 and the lead 121 to the negative side of the capacitor 114. This current flow through the base-emitter electrodes of the transistor 85 renders that transistor conducting. The resulting voltage across the resistor 89 reduces the conduction of the transistors 50 and 57. Accordingly, as explained previously in regard to the operation of the start controlling circuit 15, the current supplied to the load 35 will be reduced substantially.

The operation of the start controlling circuit in FIGURE 3 is like that of FIGURE 2. Thus, as the capacitor 120 charges after the converter is first energized from the AC source 22, the conduction of the transistor 115 decreases, consequently, decreasing the conduction of the transistor 85. This allows the conduction of the transistor 57 to increase thereby increasing the voltage supplied to the load 35. When the capacitor 120 becomes fully charged, rendering transistors 115 and 85 nonconducting, the output voltage supplied to the load 35 will be controlled by the output voltage sensing circuit 13.

The circuit of FIGURE 4 is very much like that of FIGURE 2. However, the resistor 89, the transistor 85, the capacitor 92, and the diode 87 of FIGURE 2 are eliminated from the circuit of FIGURE 4. Also, the positions of the resistors 94 and 96 are interchanged to provide a more suitable time constant for the resistor 98 and the capacitor 99. The relay winding 131a is still connected to the winding 68 by means of the diodes 88 and 91 and operates the same as in the circuit of FIGURE 2. However, the winding 131a of the relay 131 may be connected to any suitable DC source in the converter, provided that such source has a short time constant. This condition insures that the contact arms of the relay will release even for a momentary interruption of AC input power thereby activating the start controlling circuit 15. It will be understood that by substituting an AC relay for the relay 131 the diodes 88 and 91 may be removed from the circuit and the winding 131a may be connected to the AC source 22, if desired.

In FIGURE 4, the leads 101 and 102 which can be traced from the potentiometer 100 of FIGURE 1 are connected to the lead 93 and the resistor 96, respectively. With this arrangement, the potentiometer 100, is in effect, substituted for the resistor 89 of FIGURE 2. Consequently, the voltage present on the lower portion of the potentiometer 100 less the voltage dropped on resistor 96 is applied across the series combination comprising the resistor 54, the diode 97 and the resistor 94.

The voltage on the potentiometer 100 causes current to flow from the wiper arm 100a through lead 102, lead 93, lead 47, resistor 54, diode 97, resistor 94, lead 95, resistor 96 and lead 101 to the lower end of the potentiometer. The foregoing current will increase as current to the load 35 increases and, consequently, the base-emitter current of the transistor 50 tends to decrease.

If the load current becomes greater than a predetermined value, the current diverted away from the base-emitter path of the transistor 50 through the diode 97 and the resistor 96 is sufficiently great that the conduction of transistor 50 begins to decrease. This causes the voltage applied to the load 35 to decrease. Any further increase in load current produces increased voltage on the potentiometer 100 and a further decrease in the conduction of the transistor 50 and the output voltage. The conduction of transistor 50 will be decreased as much as necessary to reduce the output voltage and thereby prevent the load current from exceeding a maximum value.

The start controlling circuit 15 of FIGURE 4 is identical to that of FIGURE 2. However in the circuit of FIGURE 4, the lead 151 is connected, as shown, to the left end of the resistor 96. Also, the lead 121 is connected to the lead 95 by means of a lead 153.

Under starting conditions or after an interruption of line power the capacitor 120 is initially in a discharged condition, as explained previously. Consequently, the transistor 115 will conduct and current will flow from the positive side of the capacitor 114 through lead 116, the collector-emitter path of the transistor 115, diode 117, resistor 96, the lead 95, the lead 153 and the lead 121 to the negative side of the capacitor. This current flow produces a voltage across the resistor 96.

Because the resistor 96 is connected between the leads 101 and 95 which connect one end of the potentiometer 100 to the resistor 96, the resistor 96 and the lower portion of the potentiometer 100 are in effect connected in series. Thus the voltages of the resistor 96 and the lower portion of the potentiometer 100 are additive.

The voltage produced on the resistor 96 by the conduction of the transistor 115 plus the voltage on the lower portion of the potentiometer are applied across the series combination formed by the resistor 54, the diode 97, resistor 94 and the resistor 96. The voltage of the resistor 96 alone, regardless of the voltage on the potentiometer 100, causes sufficient current to flow through the above series combination so that the conduction of the transistor 50 is maintained at a reduced value to limit the current supplied to the load 35.

As the capacitor 120 charges, the conduction of the transistor 115 and the voltage of the resistor 96 decrease. Accordingly, the transistor 50 gradually increases in conduction and the current supplied to the load 35 increases correspondingly. When the capacitor 120 is fully charged, the transistor 115 will not conduct and, therefore, no voltage is produced across the resistor 96. Consequently, the conduction of the transistor 50 is now controlled by the potential on the wiper arm 41a of the potentiometer 41 to regulate the load voltage.

It will be understood that the embodiments shown herein are for explanatory purposes and may be changed or modified without departing from the spirit and scope of the invention as set forth in the claims appended hereto.

What I claim is:

1. In an AC to DC converter of the type in which the output voltage and current are controlled by the conduction angle of controlled rectifier means connected between AC source means and transformer means which has rectifying means connected thereto, in combination, pulse generating means, means for supplying pulses from said pulse generating means to respective controlled rectifier means, output voltage sensing means for controlling the phase relationship between the pulses of said pulse generating means and said AC source means in response to any tendency of the output voltage to vary, start controlling means including variable conducting means, bias means adapted to reduce the conduction of said variable conducting means to render said start controlling means inoperative, and bias activating means, means for connecting said start controlling means to said output voltage sensing means to effect control thereof when said start controlling means is operative, means for connecting said bias activating means to said bias means, means for supplying pulses from said pulse generating means to said bias activating means to activate said bias means and gradually render said start controlling means inoperative after the converter is energized from the AC source or after a momentary interruption of AC power.

2. In a power circuit including controlled rectifier means for supplying current to a load, pulse means for rendering said controlled rectifier means conducting, voltage sensing means for controlling said pulse means in response to the voltage of a load, a start controlling network, said network including variable conducting means, bias means and bias activating means, means for connecting said variable conducting means to said voltage sensing means to reduce the current supplied to the load when said variable conducting means conducts, said bias means being adapted to be activated by the bias activating means upon a predetermined signal from said pulse means to render the variable conducting means non-conducting to in turn activate the voltage sensing means.

3. In a power circuit including controlled rectifier means for supplying current to a load, pulse means for rendering said controlled rectifier means conducting, voltage sensing means for controlling said pulse means in response to the voltage of a load, a start controlling network, said network including variable conducting means, bias means and a controlled rectifier element, means for connecting said variable conducting means to said voltage sensing means to reduce the current supplied to the load when said variable conducting means conducts, said bias means being adapted to be activated by said controlled rectifier element upon a predetermined signal from said pulse means to render the variable conducting means non-conducting to in turn activate the voltage sensing means.

4. In a power circuit including controlled rectifier means for supplying current to a load, pulse means for rendering said controlled rectifier means conducting, voltage sensing means for controlling said pulse means in response to the voltage of a load, a start controlling network, said network including variable conducting means, a bias capacitor and a controlled rectifier element, means for connecting said variable conducting means to said voltage sensing means to reduce the current supplied to the load when said variable conducting means conducts, means for connecting said bias capacitor to said variable conducting means whereby the same is rendered non-conducting when said bias capacitor is charged, means for connecting said controlled rectifier element to said bias capacitor whereby the bias capacitor becomes charged when said controlled rectifier element is rendered conducting by a predetermined signal from said pulse means.

5. In a power circuit including controlled rectifier means for supplying current to a load, pulse means for rendering said controlled rectifier means conducting, voltage sensing means for controlling said pulse means in response to the voltage of a load, a start controlling network, said network including a transistor having an emitter-connector circuit and a base electrode, a bias capacitor, and a controlled rectifier element, means for connecting said emitter-collector circuit of said transistor to said voltage sensing means to reduce the current supplied to the load when said transistor conducts, means for connecting said bias capacitor to said base electrode of said transistor to render the same non-conducting when said bias capacitor is charged, means for connecting said controlled rectifier element to said bias capacitor to supply current thereto when a predetermined signal from said pulse means is applied to said controlled rectifier element.

6. In an AC to DC converter of the type in which the output voltage and current are controlled by the conduction angle of controlled rectifier means connected between AC source means and transformer means arranged to supply power to a load through rectifying means, in combination, pulse generating means, means for supplying pulses from said pulse generating means to respective controlled rectifier means, output voltage sensing means for controlling the phase relationship between the pulses of said pulse generating means and said AC source means in response to any tendency of the output voltage to vary, load current proportional means, current limiting means, means for connecting said load current proportional means to said current limiting means to render said current limiting means operative when load current approaches a predetermined maximum value, means for connecting said current limiting means to said output voltage sensing means whereby the output voltage of the converter is reduced sufficiently to prevent the load current from becoming greater than said predetermined maximum value when said current limiting means is operative, start controlling means including bias means for rendering said start controlling means inoperative, and bias activating means, means for connecting said start controlling means to said current limiting means whereby said current limiting means controls said output voltage sensing means when said start controlling means is operative, means for connecting said bias activating means to said bias means, means for supplying pulses from said pulse generating means to said bias activating means whereby said start controlling means is gradually rendered inactive.

7. In an AC to DC converter of the type in which the output voltage and current are controlled by the conduction angle of controlled rectifier means connected between AC source means and transformer means which has rectifying means connected thereto, in combination, pulse generating means, means for supplying pulses from said pulse generating means to respective controlled rectifier means, output voltage sensing means for controlling the phase relationship between the pulses of said pulse generating means and said AC source means in response to any tendency of the output voltage to vary, start controlling means, including bias means for rendering said start controlling means inoperative, and bias activating means, means for connecting said start controlling means to said output voltage sensing means to effect control thereof when said start controlling means is operative, means for connecting said bias activating means to said bias means, means for supplying pulses from said pulse generating means to said bias activating means to activate said bias means and gradually render said start controlling means inoperative upon failure of said AC source means, means for de-energizing said bias means upon failure of said AC source means whereby the start controlling means prevents the output current of the converter from increasing faster than a predetermined rate after any interruption of current being supplied to the converter from said AC source means.

8. In an AC to DC converter of the type in which the output voltage and current are controlled by the conduction angle of controlled rectifier means connected between AC source means and transformer means arranged to supply power to a load through rectifying means, in combination, pulse generating means, means for supplying pulses from said pulse generating means to respective controlled rectifier means, output voltage sensing means for controlling the phase relationship between the pulses of said pulse generating means and said AC source means in response to any tendency of the output voltage to vary, load current proportional means, current limiting means, means for connecting said load current proportional means to said current limiting means to render said current limiting means operative when load current approaches a predetermined maximum value, means for connecting said current limiting means to said output voltage sensing means whereby the output voltage of the converter is reduced sufficiently to prevent the load current from becoming greater than said predetermined maximum value when said current limiting means is operative, start controlling means including bias means for rendering said start controlling means inoperative, and bias activating means, means for connecting said start controlling means to said current limiting means whereby said current limiting means controls said output voltage sensing means when said start controlling means is operative, means for connecting said bias activating means to said bias means, means for supplying pulses from said pulse generating means to said bias activating means whereby said start controlling means is gradually rendered inactive, means for rendering said bias activating means inoperative upon failure of said AC source means, means for de-energizing said bias means upon failure of said AC source means whereby the start controlling means prevents the output current of the converter from increasing faster than a predetermined rate after any interruption of current being supplied to the converter from said AC source means.

9. In an AC to DC converter of the type in which the output voltage and current are determined by the conduction angle of controlled rectifier means connected between an AC source and a load, in combination, pulse generating means, means for supplying pulses from said pulse generating means to respective controlled rectifier means, output voltage sensing means connected to said pulse generating means to vary the pulses of said pulse generating means timewise with respect to the voltage alternations of the AC source to maintain the load voltage constant under normal load conditions, said output voltage sensing means including output voltage proportional means connected across the load, constant voltage reference means and a voltage comparing transistor, means for connecting the emitter electrode of said voltage comparing transistor to said constant voltage reference source, means for connecting the emitter electrode of said voltage comparing transistor to said constant voltage source, a bias resistor connected between the base electrode of said voltage comparing transistor and one end of said output voltage proportional means, a base isolating diode connected between the base electrode of said voltage comparing transistor and a point on said output voltage proportional means; current limiting means including a DC energy source, a current limiting control transistor and a load resistor, the collector-emitter path of said current limiting control transistor being connected serially in circuit relationship with said DC energy source and said load resistor, means for connecting one end of said load resistor to one end of said output voltage proportional means, unilateral conducting means connected between the other end of said load resistor and the base electrode of said voltage comparing transistor whereby the conduction of the last named transistor decreases to decrease the load voltage when the voltage across said load resistor increases; a load current proportional voltage means electrically coupled to the load current path, means for connecting said load current proportional voltage means between the base electrode of said current limiting control transistor and said other end of said load resistor to control the conduction of said current limiting control transistor; start controlling means including bias means for rendering said start controlling means inoperative and bias activating means connected to said bias means, means for supplying pulses from said pulse generating means to said bias activating means to activate said bias means and thereby gradually render said start controlling means inoperative, means for connecting said start controlling means to said current limiting control transistor to render that transistor operative when said start controlling means is operative.

References Cited
UNITED STATES PATENTS

| | | | |
|---|---|---|---|
| 3,020,491 | 2/1962 | Kurtz. | |
| 3,119,055 | 1/1964 | Martin | 318—452 |
| 3,160,829 | 12/1964 | Mahland. | |
| 3,253,209 | 5/1966 | Hordosi | 321—18 |
| 3,304,486 | 2/1967 | Michaels | 321—18 |

ORIS L. RADER, *Primary Examiner.*

H. HUBERFELD, *Assistant Examiner.*